United States Patent
Wang et al.

(10) Patent No.: US 12,546,811 B2
(45) Date of Patent: Feb. 10, 2026

(54) DETECTION DEVICE CONFIGURED TO DETECT ABNORMALITY OF LIGHT-EMITTING PANEL AND DETECTION METHOD THEREOF

(71) Applicant: TCL China Star Optoelectronics Technology Co., Ltd., Guangdong (CN)

(72) Inventors: Wuhui Wang, Guangdong (CN); Xing Ouyang, Guangdong (CN); Litao Yang, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 713 days.

(21) Appl. No.: 17/271,236

(22) PCT Filed: Dec. 30, 2020

(86) PCT No.: PCT/CN2020/141578
§ 371 (c)(1),
(2) Date: Aug. 31, 2023

(87) PCT Pub. No.: WO2022/134171
PCT Pub. Date: Jun. 30, 2022

(65) Prior Publication Data
US 2023/0417817 A1    Dec. 28, 2023

(30) Foreign Application Priority Data
Dec. 24, 2020   (CN) .......................... 202011555503.7

(51) Int. Cl.
*G01R 31/26*   (2020.01)
*G01R 27/26*   (2006.01)

(52) U.S. Cl.
CPC ..... *G01R 31/2635* (2013.01); *G01R 27/2605* (2013.01)

(58) Field of Classification Search
CPC ............ G01R 31/2635; G01R 27/2605; G01R 31/52; G01R 31/54; G09G 3/32; G09G 2300/0426; G09G 3/006
See application file for complete search history.

(56) References Cited

U.S. PATENT DOCUMENTS

| | | | |
|---|---|---|---|
| 6,154,038 A | 11/2000 | Ito et al. | |
| 2011/0205200 A1* | 8/2011 | Tsubata | G02F 1/136259 345/206 |
| 2015/0162393 A1* | 6/2015 | Kang | H10K 10/482 438/23 |

(Continued)

FOREIGN PATENT DOCUMENTS

| CN | 1358274 | 7/2002 |
|---|---|---|
| CN | 101819496 | 9/2010 |
| CN | 105190500 | 12/2015 |

(Continued)

*Primary Examiner* — Alvaro E Fortich

(57) ABSTRACT

A detection device, a detection method, and a display device for detecting abnormality of a light-emitting panel are provided. The detection device includes a first substrate, a detection metal layer disposed on the first substrate, and a detection unit. The detection metal layer includes a plurality of electrode blocks spaced apart, and the detection unit is connected to the electrode blocks to detect a capacitance signal sent by each of the electrode blocks.

13 Claims, 4 Drawing Sheets

(56) References Cited

U.S. PATENT DOCUMENTS

2018/0247959 A1* 8/2018 Chen .................... H10K 71/231
2021/0312843 A1* 10/2021 Han ..................... G09G 3/3677

FOREIGN PATENT DOCUMENTS

| CN | 106601159 | 4/2017 |
| CN | 109164615 | 1/2019 |
| CN | 110095704 | 8/2019 |

* cited by examiner

DETECTION DEVICE CONFIGURED TO DETECT ABNORMALITY OF LIGHT-EMITTING PANEL AND DETECTION METHOD THEREOF

RELATED APPLICATIONS

This application is a National Phase of PCT Patent Application No. PCT/CN2020/141578 having International filing date of Dec. 30, 2020, which claims the benefit of priority of Chinese Patent Application No. 202011555503.7 filed on Dec. 24, 2020. The contents of the above applications are all incorporated by reference as if fully set forth herein in their entirety.

FIELD AND BACKGROUND OF THE INVENTION

At present, due to limitations of traditional liquid crystal display (LCD) panels such as high power consumption and low contrast ratio, backlights of LCD panels are forced to develop in a direction of localized controllability. Therefore, mini light-emitting diode (LED) and micro LED display technologies have emerged in the industry. Mini LED and micro LED display technologies use multiple small-sized LED lights as a light source of the display panels, so as to realize partition control and improve a contrast ratio and saturation of display images.

In mini LED and micro LED light-emitting panels, multiple LED lights are arrayed to form an LED matrix. Multiple scan lines are disposed in a lateral direction to provide scan signals for driving the LED lights, multiple data lines are disposed in a longitudinal direction to provide data signals for driving the LED lights, and there are multiple overlapping points between the data lines and the scan lines.

However, although there is an insulating layer disposed between the scan lines and the data lines, the overlapping points of the scan lines and the data lines are prone to abnormalities such as short circuit and open circuit. Because the lines in the light-emitting panel are dense, it is difficult to find an abnormal point on the light-emitting panels where a short circuit occurs.

SUMMARY OF THE INVENTION

Technical Problem

In current mini light-emitting diode (LED) and micro LED light-emitting panels, abnormalities such as short circuits and open circuits are prone to occur at an overlapping point of scan lines and data lines. However, because the lines in the light-emitting panel are dense, it is difficult to find an abnormal point on the light-emitting panels where a short circuit occurs.

Technical Solutions

In a first aspect, the present application provides a detection device configured to detect abnormality of a light-emitting panel, including:
a first substrate;
a detection metal layer disposed on the first substrate, wherein the detection metal layer includes a plurality of electrode blocks spaced apart; and
a detection unit connected to the electrode blocks, wherein the detection unit is configured to detect a capacitance signal sent by each of the electrode blocks.

In some embodiments, the electrode blocks are distributed in an array.

In some embodiments, a width of one of the electrode blocks in a lateral direction is greater than a width of any one of data lines in the light-emitting panel to be detected, and a width of one of the electrode blocks in a longitudinal direction is greater than a width of any one of scan lines in the light-emitting panel to be detected.

In some embodiments, a width of one of the electrode blocks in a longitudinal direction is greater than a width of a gap between adjacent two of scan lines in the light-emitting panel to be detected, and a width of one of the electrode blocks in a lateral direction is greater than a width of a gap between adjacent two of data lines in the light-emitting panel to be detected.

In some embodiments, a surface area of one of the electrode blocks is greater than an area of an overlap between any scan line and any data line in the light-emitting panel to be tested.

In some embodiments, each of the electrode blocks is connected to the detection unit through an independent wire.

In some embodiments, the wire is arranged on a side of the first substrate away from the detection metal layer.

In a second aspect, the present application further provides a detection method of detecting abnormality of a light-emitting panel, including following steps:
S10, placing a detection device opposite to a light-emitting panel, wherein a plurality of electrode blocks in the detection device are disposed opposite to scan lines and data lines in the light-emitting panel;
S20, inputting a detection signal to the scan lines and the data lines in the light-emitting panel;
S30, sending a capacitance signal to the detection unit by each of the electrode blocks; and
S40, determining an abnormal position on the light-emitting panel according to all of the capacitance signals received by the detection unit.

In some embodiments, the step S40 includes:
S41, determining a position of the electrode blocks with abnormal capacitance on the detection device according to all of the capacitance signals received by the detection unit; and
S42, determining the abnormal position on the light-emitting panel according to the position of the electrode blocks with abnormal capacitance.

In some embodiments, the detection method further including:
S50, determining an abnormal cause by observing the abnormal position on the light-emitting panel using a microscope.

In a third aspect, the present application further provides a detection device configured to detect abnormality of a light-emitting panel, including:
a first substrate;
a detection metal layer disposed on the first substrate, the detection metal layer including a plurality of electrode blocks spaced apart; and
a detection unit connected to the electrode blocks, wherein the detection unit is configured to detect a capacitance signal sent by each of the electrode blocks, and the detection unit includes one or more detection chips.

In some embodiments, the electrode blocks are distributed in an array.

In some embodiments, a width of one of the electrode blocks in a lateral direction is greater than a width of any one of data lines in the light-emitting panel to be detected, and a width of one of the electrode blocks in a longitudinal direction is greater than a width of any one of scan lines in the light-emitting panel to be detected.

In some embodiments, a width of one of the electrode blocks in a longitudinal direction is greater than a width of a gap between adjacent two of scan lines in the light-emitting panel to be detected, and a width of one of the electrode blocks in a lateral direction is greater than a width of a gap between adjacent two of data lines in the light-emitting panel to be detected.

In some embodiments, a surface area of the electrode blocks is greater than an area of an overlap between any scan line and any data line in the light-emitting panel to be tested.

In some embodiments, each of the electrode blocks is connected to the detection unit through an independent wire.

In some embodiments, the wire is arranged on a side of the first substrate away from the detection metal layer.

Beneficial Effect

If the light-emitting panel is abnormal, the abnormality of the light-emitting panel can be detected by the detection device. A detection capacitor is formed by the electrode blocks in the detection device and the scan lines and data lines on the light-emitting panel. A capacitance value of the detection capacitor positioned at an abnormal point is different from the capacitance value of the detection capacitor position in a normal region. Therefore, the abnormal point on the light-emitting panel can be determined according to a position of the detection capacitor with an abnormal capacitance, so that the abnormal point on the light-emitting panel can be found more conveniently and quickly, and the abnormality of the abnormal point can be analyzed and processed. At the same time, the detection device is configured separately. After the detection is completed, the detection device can be detached from the light-emitting panel, and one detection device can be configured to perform abnormality detection on multiple light-emitting panels to reduce costs.

BRIEF DESCRIPTION OF THE SEVERAL VIEWS OF THE DRAWINGS

The following detailed description of the specific embodiments of the present application in conjunction with the accompanying drawings will make the technical solutions and other beneficial effects of the present application obvious.

Figure 1:
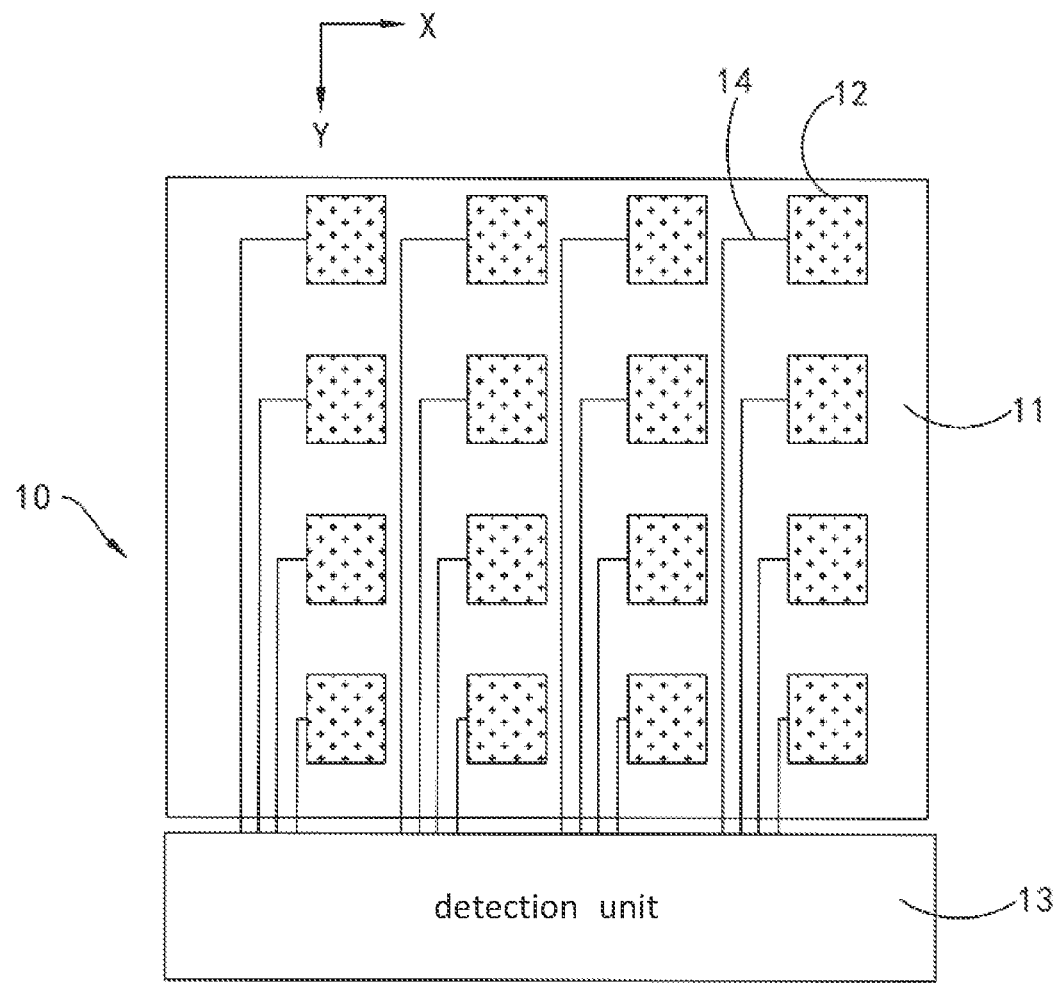
FIG. 1 is a schematic structural diagram of a detection device provided by an embodiment of the present application.

REFERENCE SIGNS 10, detection device; 11, first substrate; 12, electrode block; 13, detection unit; 14, wire; 20, light-emitting panel; 21, second substrate; 22, scan line; 23, insulating layer; 24, data line; 241, overlap portion; 25, passivation layer; and 26, light-emitting unit.

DESCRIPTION OF SPECIFIC EMBODIMENTS OF THE INVENTION

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention. In the drawings, components having similar structures are denoted by the same numerals.

The present application is aimed at conventional mini light-emitting diode (LED) and micro LED light-emitting panels, where abnormalities such as short circuits and open circuits are prone to occur at overlapping points of scan lines and data lines. However, because the lines in the light-emitting panels are dense, there is a technical problem that it is difficult to find an abnormal point on the light-emitting panels.

The present application provides a detection device configured to detect abnormality of the light-emitting panels. As shown in FIG. 1, the detection device 10 includes a first substrate 11, a detection metal layer disposed on the first substrate 11, and a detection unit 13.

Wherein, the detection metal layer includes a plurality of electrode blocks 12 spaced apart, and the detection unit 13 is connected to the electrode blocks 12 for detecting a capacitance signal sent by each of the electrode blocks 12. The detection unit 13 can include one or more detection chips.

It should be noted that when the light-emitting panel is detected, the detection device 10 is placed opposite to the light-emitting panel, and then the detection device 10 is aligned with the light-emitting panel. At this time, the electrode blocks 12 face the scan lines and data lines on the light-emitting panel. Each of the electrode blocks 12 and corresponding one of the scan lines and corresponding one of the data lines form a detection capacitor, and the detection unit 13 determines a capacitance of the detection capacitor according to the received capacitance signal.

If the light-emitting panel is abnormal, that is, when the data line and the scan line are short circuited or open-circuited at an overlap portion, a detection signal can be input to the scan line and the data line. At this time, all the electrode blocks 12 on the detection device 10 corresponding to the abnormal scan line and data line send a first capacitance signal to the detection unit 13, and the electrode blocks 12 on the detection device 10 corresponding to the scan line and data line without abnormality send a second capacitance signal to the detection unit 13. The first capacitance signal is different from the second capacitance signal, so that a position of the abnormal scan line and data line on the light-emitting panel can be determined according to a position of the electrode block 12 that sends the first capacitance signal, so as to determine a position of the overlapping point where the scan line and the data line is abnormal, so that an abnormal point on the light-emitting panel can be found more conveniently and quickly, and the abnormality of the abnormal point can be analyzed and processed. At the same time, the detection device 10 is configured separately. After the detection is completed, the detection device 10 can be detached from the light-emitting panel, and one detection device 10 can be configured to perform abnormality detection on multiple light-emitting panels to reduce costs.

Specifically, the electrode blocks 12 are disposed in an array, so as to determine the abnormal point on the light-emitting panel according to the position of a corresponding electrode block 12 on the detection device 10.

It should be noted that if the electrode blocks 12 are disposed in blocks and disposed in an orderly manner, a coordinate system about an X axis (as shown in FIG. 1) and a Y axis (as shown in FIG. 1) can be established, so that a coordinate of each of the electrode blocks 12 can be established in the coordinate system. For example, a coordinate of the electrode block 12 in a first row and a first column is (1, 1), and a coordinate of the electrode block 12 in a second row and a first column is (2, 1). The coordinates of the electrode block 12 in the second row and a second column are (2, 2), and so on. Therefore, the position of the electrode block 12 corresponding to the abnormality on the light-emitting panel in the detection device 10 can be quickly positioned according to the capacitance signal received by the detection unit 13 to improve a detection efficiency.

Specifically, each of the electrode blocks 12 is connected to the detection unit 13 through an independent wire 14 to prevent from a mutual interference of the electrode blocks 12.

In an embodiment, the wires 14 and the electrode blocks 12 are disposed in a same layer to reduce an overall thickness and cost of the detection device 10.

In an embodiment, the wires 14 can be positioned at a different level from the electrode blocks 12, so that when a surface area of the first substrate 11 is constant, more electrode blocks 12 can be disposed to improve a detection accuracy. Moreover, sufficient space can be provided for an arrangement of the wires 14 to prevent short circuit of the two electrode blocks 12 caused by the wires 14.

Wherein, an insulating isolation layer can be added between the wires 14 and the electrode blocks 12 to isolate the wires 14 from the electrode blocks 12, and the wires 14 are connected to the electrode blocks 12 through through-holes penetrating the insulating isolation layer.

Wherein, the wires 14 can also be disposed on a side of the first substrate 11 away from the detection metal layer. At this time, the wires 14 are connected to the electrode blocks 12 through the through-holes penetrating the first substrate 11 to lower the overall thickness of the detection device 10. At the same time, it can provide enough space for the arrangement of the wires 14 to prevent the wires 14 from causing the two electrode blocks 12 to short circuit.

Figure 2:
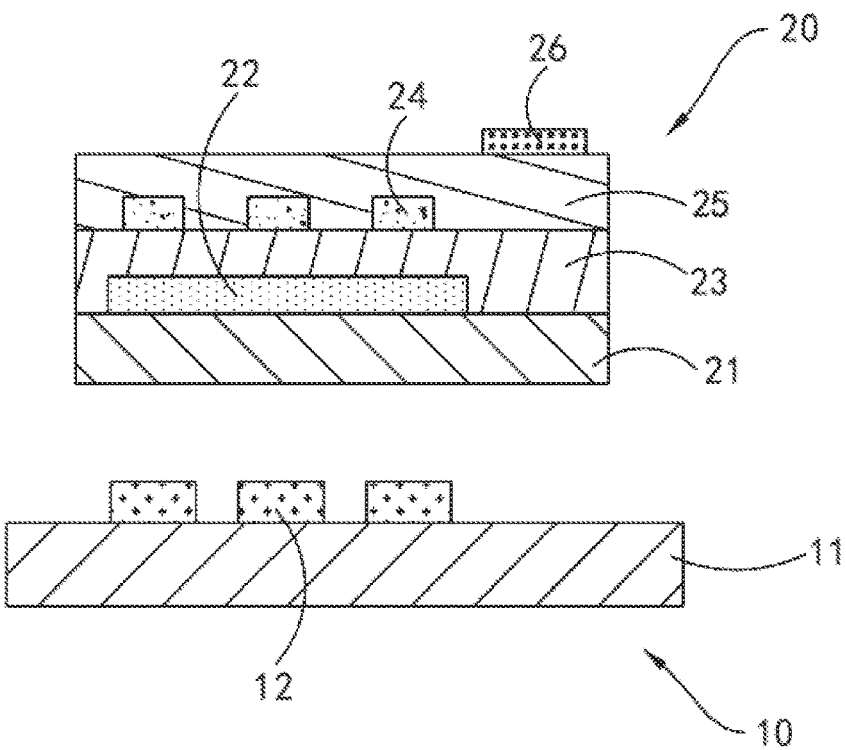
FIG. 2 is a schematic structural diagram of the detection device and a light-emitting panel provided by an embodiment of the present application.
Figure 3:
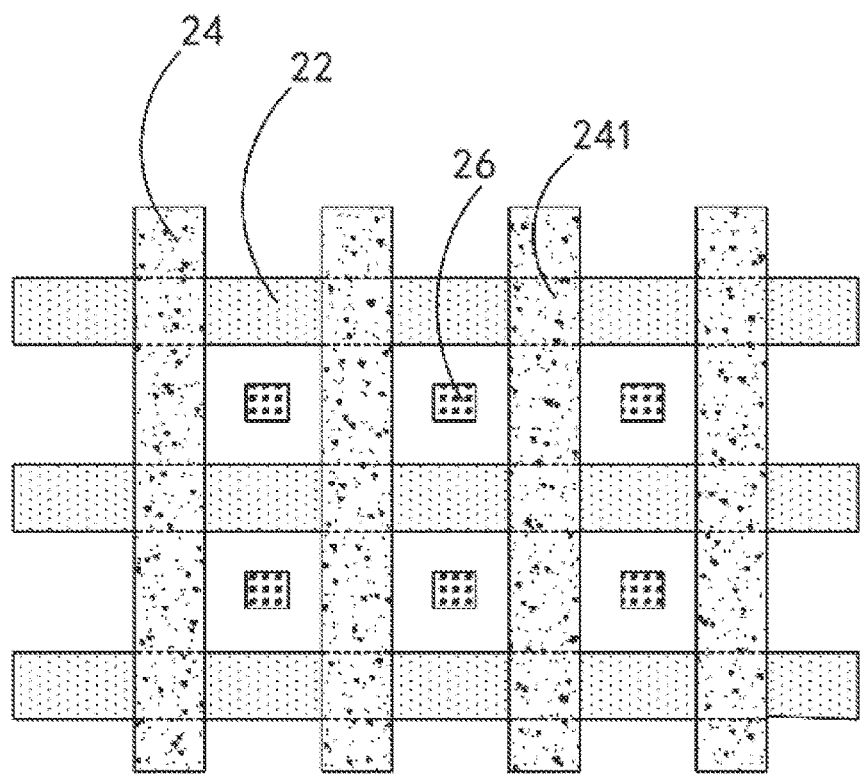
FIG. 3 is a schematic distribution diagram of scan lines, data lines, and light-emitting units in the light-emitting panel provided by an embodiment of the present application.

As shown in FIG. 2 and FIG. 3, when the detection device 10 is configured to detect the light-emitting panel 20 to be detected, the light-emitting panel 20 and the detection device 10 are disposed oppositely, and the detection device 10 can be positioned on an upper side or lower side of the light-emitting panel 20.

Specifically, the light-emitting panel 20 includes a second substrate 21, a scan line 22 disposed above the second substrate 21, and a data line 24 positioned on a different layer from the scan line 22. A plurality of the scan lines 22 are disposed along a lateral direction, a plurality of the data lines 24 are disposed along a longitudinal direction, and the data lines 24 and the scan lines 22 are crisscrossed to form a grid-like structure.

Specifically, the light-emitting panel 20 further includes a plurality of light-emitting units 26, and the light-emitting units 26 are positioned in grids of the grid-like structure.

In an embodiment, one of the light-emitting units 26 is positioned in one of the grids, and the light-emitting units 26 can be LED lights.

In an embodiment, the light-emitting panel 20 further includes an insulating layer 23 and a passivation layer 25, the insulating layer 23 covers the scan lines 22, and the data lines 24 are disposed on the insulating layer 23. The passivation layer 25 covers the data lines 24 and the insulating layer 23, and the light-emitting units 26 are disposed on the passivation layer 25.

Specifically, when the detection device 10 is configured to detect the light-emitting panel 20, the electrode blocks 12 in the detection device 10 are disposed opposite to the scan lines 22 and the data lines 24 in the light-emitting panel 20. The electrode block 12 and a corresponding scan line 22 form a first capacitor, and the electrode block 12 and a corresponding data line 24 form a second capacitor.

When the detection device 10 is configured to detect the light-emitting panel 20, an orthographic projection of the detection metal layer in the detection device 10 on the first substrate 11 covers an orthographic projection of the data line 24 on the first substrate 11. The orthographic projection of the detection metal layer on the first substrate 11 covers an orthographic projection of the scan line 22 on the first substrate 11.

In an embodiment, a width of the electrode blocks 12 in the lateral direction is greater than a width of the data lines 24 in the light-emitting panel 20 to be detected, and a width of the electrode blocks 12 in the longitudinal direction is greater than a width of the scan lines 22 in the light-emitting panel to be detected.

It should be noted that when the detection device 10 is configured to detect the light-emitting panel 20, a row of the electrode blocks 12 disposed in the lateral direction corresponds to at least one of the scan lines 22, and a row of the electrode blocks 12 disposed in the longitudinal direction corresponds to at least one of the data lines.

It can be understood that in the light-emitting panel 20 with denser lines, a line width and line pitch of the data lines 24 and the scan lines 22 are smaller. An area of the electrode blocks 12 can be increased, so that a row of electrode blocks 12 can be configured to detect multiple scan lines 22, and a column of electrode blocks 12 can be configured to detect multiple data lines 24. When the scan line 22 and the data line 24 is short-circuited or disconnected, the detection device 10 can be configured to initially locate an abnormal region on the light-emitting panel 20, and then directly observe the abnormal region with a microscope or other instruments to directly locate the abnormal point, so that the abnormal point on the light-emitting panel 20 can be found more conveniently and quickly, and a manufacturing difficulty of the detection device 10 can also be reduced.

In an embodiment, the width of the electrode blocks 12 in the longitudinal direction is greater than a width of a gap between adjacent two of the scan lines 22 in the light-emitting panel 20 to be detected, and the width of the electrode blocks 12 in the lateral direction is greater than a width of a gap between adjacent two of the data lines 24 in the light-emitting panel 20 to be detected.

It is understandable that when the detection device 10 is configured to detect the light-emitting panel 20, even if the detection device 10 and the light-emitting panel 20 are misaligned, it can still be ensured that the electrode block 12 on the detection device 10 and the scan line 22 and the data line 24 on the light-emitting panel to form the detection capacitor.

Specifically, each of the data lines 24 overlaps the scan lines 22, and each of the data lines 24 includes a plurality of overlap portions 241 that overlap the scan lines 22.

In an embodiment, a surface area of the electrode blocks 12 is greater than an area of an overlap between any scan line 22 and any data line 24 in the light-emitting panel 20 to be detected, that is, the surface area of one of the electrode blocks 12 is greater than a surface area of the overlap portion 241.

It should be noted that a value of the surface area of the electrode blocks 12 refers to an area of a side of the electrode blocks 12 away from the first substrate 11, and a value of the surface area of the overlap portion 241 refers to an area of a side of the overlap portion 241 away from the second substrate 21.

In an embodiment, when the detection device 10 is configured to detect the light-emitting panel 20, the orthographic projection of each of the electrode blocks 12 on the second substrate 21 covers an orthographic projection of at least one of the overlap portions 241 on the second substrate 21.

It should be noted that when the scan line 22 and the data line 24 are short-circuited and open-circuited at the overlap, the detection device 10 can be configured to directly locate the abnormal overlap to improve the detection efficiency.

In an embodiment, when the detection device 10 is configured to detect the light-emitting panel 20, each of the electrode blocks 12 corresponds to the overlap portion 241 one-to-one to further improve the detection efficiency.

Figure 4:
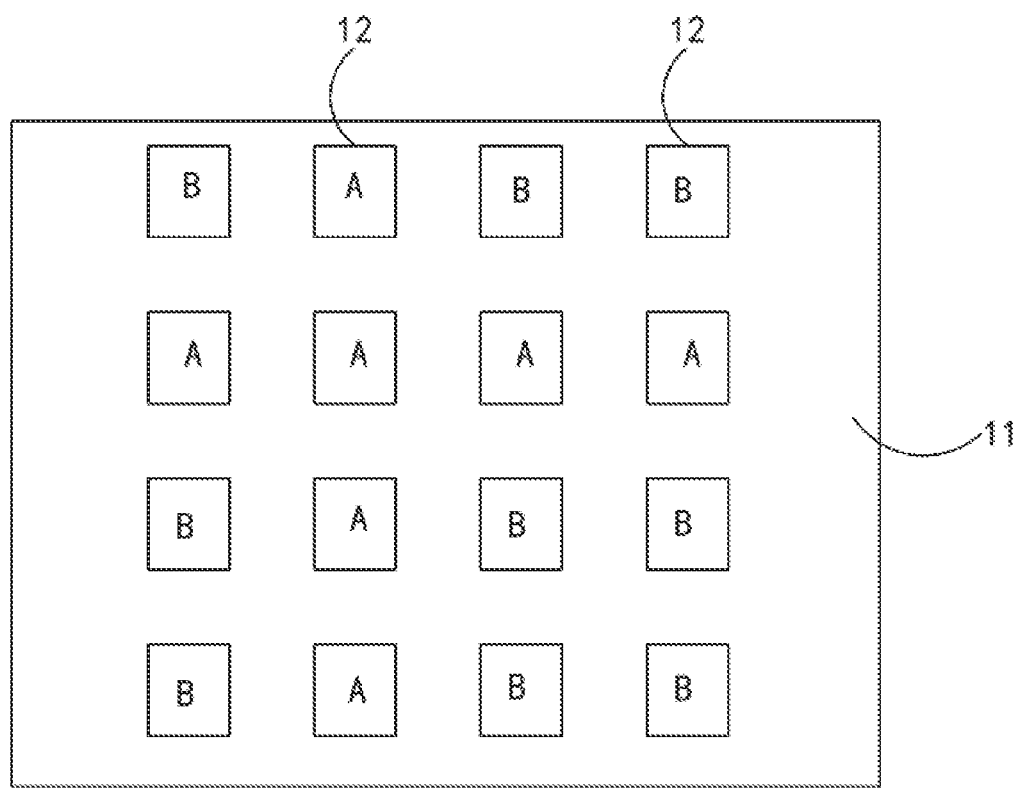
FIG. 4 is a schematic diagram of the detection device during detection provided by an embodiment of the present application.

As shown in FIG. 4, it should be noted that while the detection device 10 is configured to detect the light-emitting panel 20, when a scan line 22 and a data line 24 overlap and a short circuit or open circuit and other abnormalities occur, the abnormal scan line 22 is a first scan line 22, the abnormal data line 24 is a first data line 24, and all the electrode blocks 12 in a row of the electrode blocks 12 corresponding to the first scan line 22 and all the electrode blocks 12 in a column of the electrode blocks 12 corresponding to the first data line 24 are A-electrode blocks 12, and remaining electrode blocks 12 are B-electrode blocks 12. When a detection signal is input to the scan line 22 and the data line 24, a potential on the entire first scan line 22 and the first data line 24 will change due to the abnormality in the overlap. Therefore, all of the A-electrode blocks 12 send the first capacitance signal to the detection unit 13, and all of the B-electrode blocks 12 send the second capacitance signal to the detection unit 13. The detection unit 13 can determine a position of all of the A-electrode blocks 12 according to the received first capacitance signal, and the A electrode block 12 positioned at an intersection of a row of A-electrode blocks 12 and a column of A-electrode blocks 12 is the A-electrode block 12 corresponding to an overlap of the first scan line 22 and the first data line 24. Therefore, the abnormal point where the abnormality occurs can be directly determined from the position of the A-electrode block 12.

Figure 5:
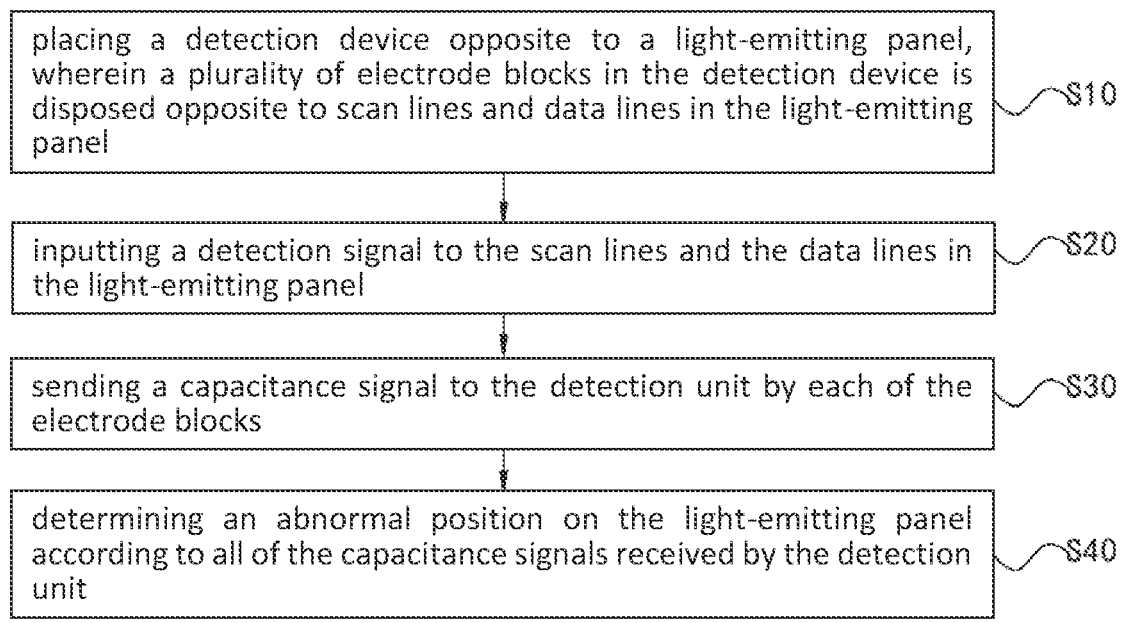
FIG. 5 is a schematic diagram of steps of a detection method provided by an embodiment of the present application.

Based on the above-mentioned detection device 10, the present application further provides a detection method of detecting abnormality of a light-emitting panel. As shown in FIG. 5, the detection method includes following steps:

S10, placing a detection device 10 opposite to a light-emitting panel, wherein a plurality of electrode blocks 12 in the detection device 10 are disposed opposite to scan lines and data lines in the light-emitting panel;

S20, inputting a detection signal to the scan lines and the data lines in the light-emitting panel;

S30, sending a capacitance signal to the detection unit 13 by each of the electrode blocks 12; and S40, determining an abnormal position on the light-emitting panel according to all of the capacitance signals received by the detection unit 13.

It is understandable that when the light-emitting panel is detected, if the light-emitting panel is abnormal, all the electrode blocks 12 corresponding to the abnormal scan line and data line send a first capacitance signal to the detection unit 13, and the electrode blocks 12 corresponding to the scan line and data line without abnormality send a second capacitance signal to the detection unit 13. The first capacitance signal is different from the second capacitance signal, and the electrode block 12 sending the first capacitance signal is the electrode block 12 with abnormal capacitance. Hence, a position of the corresponding abnormal scan line and data line on the light-emitting panel can be determined according to a position of the electrode block 12 that has the abnormal capacitance, so as to determine a position of the overlapping point where the scan line and the data line is abnormal. Therefore, an abnormal point on the light-emitting panel can be found more conveniently and quickly, and the abnormality of the abnormal point can be analyzed and processed.

Specifically, the step S40 includes:

S41, determining a position of the electrode blocks 12 with abnormal capacitance on the detection device 10 according to all of the capacitance signals received by the detection unit 13;

S42, determining the abnormal position on the light-emitting panel 20 according to the position of the electrode blocks 12 with abnormal capacitance.

In an embodiment, the detection method further includes:

S50, determining an abnormal cause by observing the abnormal position on the light-emitting panel using a microscope.

It is understandable that after determining the abnormal position on the display panel, the abnormal position can be directly observed with the microscope to review the abnormal position and further narrow an abnormal region, and at the same time, the abnormal position can be observed through the microscope to analyze and determine an abnormal type, such as short circuit and open circuit.

Specifically, the electrode blocks 12 are disposed in an array, so as to determine the abnormal point on the light-emitting panel according to the position of the corresponding electrode blocks 12 on the detection device 10.

Specifically, each of the electrode blocks 12 is connected to the detection unit 13 through an independent wire 14 to prevent from a mutual interference of the electrode blocks 12.

In an embodiment, the wire 14 and the electrode blocks 12 are disposed in a same layer to reduce an overall thickness and cost of the detection device 10.

In an embodiment, the wire 14 and the electrode blocks 12 can be disposed in a different layer.

Wherein, an insulating layer 23 can be added between the wire 14 and the electrode block 12 to isolate the wire 14 from the electrode block 12, at this time the wire 14 is connected to the electrode block 12 through a through-hole penetrating the insulating layer 23.

Wherein, it is also possible to arrange the wire 14 on a side of the first substrate 11 away from the detection metal layer. At this time, the wire 14 is connected to the electrode block 12 through a through-hole penetrating the first substrate 11.

When the detection device 10 is configured to detect the light-emitting panel 20, the electrode blocks 12 in the detection device 10 are disposed opposite to the scan line 22 and the data line 24 in the light-emitting panel 20, and the electrode blocks 12 and a corresponding scan line 22 form a first capacitor, and the electrode blocks 12 and a corresponding data line 24 form a second capacitor.

When the detection device 10 is configured to detect the light-emitting panel 20, an orthographic projection of the detection metal layer in the detection device 10 on the first substrate 11 covers an orthographic projection of the data line 24 on the first substrate 11. The orthographic projection of the detection metal layer on the first substrate 11 covers an orthographic projection of the scan line 22 on the first substrate 11.

In an embodiment, a width of the electrode blocks 12 in the lateral direction is greater than a width of the data lines 24 in the light-emitting panel 20 to be detected, and a width of the electrode blocks 12 in the longitudinal direction is greater than a width of the scan lines 22 in the light-emitting panel to be detected.

It should be noted that when the detection device 10 is configured to detect the light-emitting panel 20, a row of the electrode blocks 12 disposed in the lateral direction corresponds to at least one of the scan lines 22, and a row of the electrode blocks 12 disposed in the longitudinal direction corresponds to at least one of the data lines.

In an embodiment, the width of the electrode blocks 12 in the longitudinal direction is greater than a width of a gap between adjacent two of the scan lines 22 in the light-emitting panel 20 to be detected, and the width of the electrode blocks 12 in the lateral direction is greater than a width of a gap between adjacent two of the data lines 24 in the light-emitting panel 20 to be detected.

In an embodiment, a surface area of the electrode blocks 12 is greater than an area of an overlap between any scan line 22 and any data line 24 in the light-emitting panel 20 to be detected, that is, the surface area of one of the electrode blocks 12 is greater than a surface area of the overlap portion 241.

It should be noted that a value of the surface area of the electrode blocks 12 refers to an area of a side of the electrode blocks 12 away from the first substrate 11, and a value of the surface area of the overlap portion 241 refers to an area of a side of the overlap portion 241 away from the second substrate 21.

In an embodiment, when the detection device 10 is configured to detect the light-emitting panel 20, the orthographic projection of each of the electrode blocks 12 on the second substrate 21 covers an orthographic projection of at least one of the overlap portions 241 on the second substrate 21.

In an embodiment, when the detection device 10 is configured to detect the light-emitting panel 20, each of the electrode blocks 12 corresponds to the overlap portion 241 one-to-one to further improve the detection efficiency.

The beneficial effect of the present application is that if the light-emitting panel 20 is abnormal, the abnormality of the light-emitting panel 20 can be detected by the detection device 10. A detection capacitor is formed by the electrode blocks 12 in the detection device 10 and the scan lines 22 and data lines 24 on the light-emitting panel 20. A capacitance value of the detection capacitor positioned at an abnormal point is different from the capacitance value of the detection capacitor position in a normal region. Therefore, the abnormal point on the light-emitting panel 20 can be determined according to a position of the detection capacitor with an abnormal capacitance, so that the abnormal point on the light-emitting panel 20 can be found more conveniently and quickly, and the abnormality of the abnormal point can be analyzed and processed. At the same time, the detection device 10 is configured separately. After the detection is completed, the detection device 10 can be detached from the light-emitting panel 20, and one detection device 10 can be configured to perform abnormality detection on multiple light-emitting panels 20 to reduce costs.

In the above-mentioned embodiments, the description of each embodiment has its own focus. For parts that are not described in detail in an embodiment, reference may be made to related descriptions of other embodiments.

Specific embodiments have been used in this document to explain the principle and implementation of the present application. The descriptions of the above embodiments are only used to help understand the technical solution of the present application and its core ideas. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A detection device configured to detect abnormality of a light-emitting panel to be detected, comprising:
    a first substrate;
    a detection metal layer disposed on the first substrate, wherein the detection metal layer comprises a plurality of electrode blocks spaced apart; and
    a detection unit connected to the electrode blocks, wherein the detection unit is configured to detect a capacitance signal sent by each of the electrode blocks,
    wherein the electrode blocks are distributed in an array, and
    wherein a width of one of the electrode blocks in a lateral direction is greater than a width of any one of data lines in the light-emitting panel to be detected, and a width of one of the electrode blocks in a longitudinal direction is greater than a width of any one of scan lines in the light-emitting panel to be detected.

2. The detection device configured to detect abnormality of the light-emitting panel according to claim 1, wherein a width of one of the electrode blocks in the longitudinal direction is greater than a width of a gap between adjacent two of scan lines in the light-emitting panel to be detected, and a width of one of the electrode blocks in the lateral direction is greater than a width of a gap between adjacent two of data lines in the light-emitting panel to be detected.

3. The detection device configured to detect abnormality of the light-emitting panel according to claim 1, wherein a surface area of one of the electrode blocks is greater than an area of an overlap between any scan line and any data line in the light-emitting panel to be detected.

4. The detection device configured to detect abnormality of the light-emitting panel according to claim 1, wherein each of the electrode blocks is connected to the detection unit through an independent wire.

5. The detection device configured to detect abnormality of the light-emitting panel according to claim 4, wherein the wire is arranged on a side of the first substrate away from the detection metal layer.

6. A detection method of detecting abnormality of a light-emitting panel, comprising following steps:
- S10, placing a detection device opposite to a light-emitting panel, wherein a plurality of electrode blocks in the detection device are disposed opposite to scan lines and data lines in the light-emitting panel;
- S20, inputting a detection signal to the scan lines and the data lines in the light-emitting panel;
- S30, sending a capacitance signal to a detection unit by each of the electrode blocks; and
- S40, determining an abnormal position on the light-emitting panel according to all of the capacitance signals received by the detection unit.

7. The detection method of detecting abnormality of the light-emitting panel according to claim 6, wherein the step S40 comprises:
- S41, determining a position of the electrode blocks with abnormal capacitance on the detection device according to all of the capacitance signals received by the detection unit; and
- S42, determining the abnormal position on the light-emitting panel according to the position of the electrode blocks with abnormal capacitance.

8. The detection method of detecting abnormality of the light-emitting panel according to claim 6, further comprising:
- S50, determining an abnormal cause by observing the abnormal position on the light-emitting panel using a microscope.

9. A detection device configured to detect abnormality of a light-emitting panel, comprising:
- a first substrate;
- a detection metal layer disposed on the first substrate, the detection metal layer comprising a plurality of electrode blocks spaced apart; and
- a detection unit connected to the electrode blocks, wherein the detection unit is configured to detect a capacitance signal sent by each of the electrode blocks, and the detection unit comprises one or more detection chips,
- wherein the electrode blocks are distributed in an array, and
- wherein a width of one of the electrode blocks in a lateral direction is greater than a width of any one of data lines in the light-emitting panel to be detected, and a width of one of the electrode blocks in a longitudinal direction is greater than a width of any one of scan lines in the light-emitting panel to be detected.

10. The detection device configured to detect abnormality of the light-emitting panel according to claim 9, wherein a width of one of the electrode blocks in the longitudinal direction is greater than a width of a gap between adjacent two of scan lines in the light-emitting panel to be detected, and a width of one of the electrode blocks in the lateral direction is greater than a width of a gap between adjacent two of data lines in the light-emitting panel to be detected.

11. The detection device configured to detect abnormality of the light-emitting panel according to claim 9, wherein a surface area of one of the electrode blocks is greater than an area of an overlap between any scan line and any data line in the light-emitting panel to be detected.

12. The detection device configured to detect abnormality of the light-emitting panel according to claim 9, wherein each of the electrode blocks is connected to the detection unit through an independent wire.

13. The detection device configured to detect abnormality of the light-emitting panel according to claim 12, wherein the wire is arranged on a side of the first substrate away from the detection metal layer.

* * * * *